UNITED STATES PATENT OFFICE.

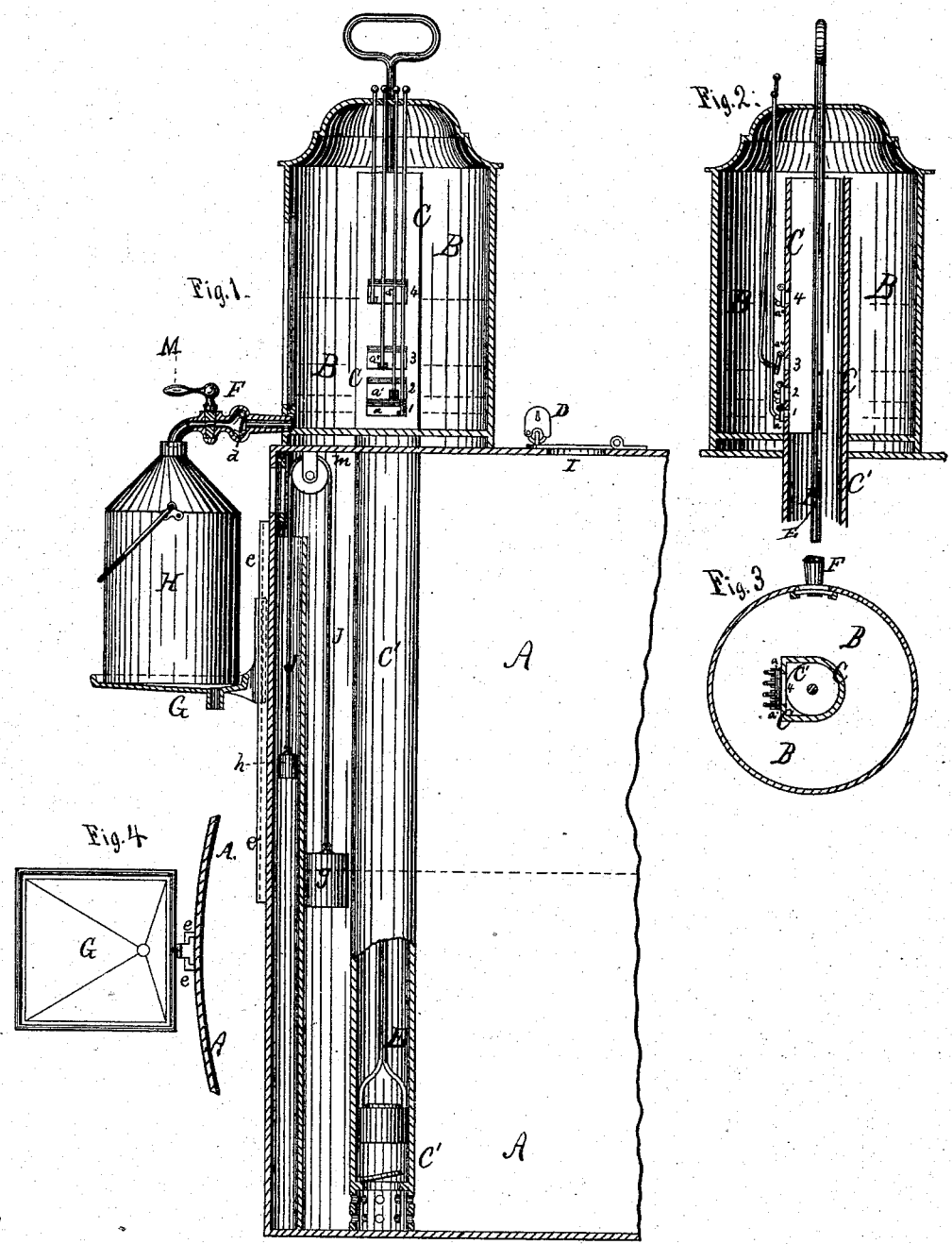

JOSEPH LESSLER, OF BUFFALO, NEW YORK.

IMPROVEMENT IN MEASURING-TANKS.

Specification forming part of Letters Patent No. 160,530, dated March 9, 1875; application filed September 23, 1874.

*To all whom it may concern:*

Be it known that I, JOSEPH LESSLER, of the city of Buffalo, in the county of Erie and State of New York, have invented a new and useful Improvement in Tanks or Cabinets for Holding Oil or other Liquids, which may be locked or sealed to prevent the adulteration of its contents, in combination with a measuring and pumping device, whereby any quantity desired may be measured and drawn off by a faucet provided with a check-valve, preventing the return of any liquid into the tank.

The invention further consists in an adjustable platform, upon which may be placed the vessel or can to receive the liquid directly from the faucet, and without the aid of a funnel.

The invention furthermore consists in an index or wheel and tape, by which the quantity of liquid in the tank may be ascertained at any time.

I do declare that the following is a full and exact description of the same, reference being had to the annexed drawings making part of this specification, and in which letters of like name and kind refer to like parts in each of the figures.

Figure 1 is a sectional front elevation of the whole device. Fig. 2 is a sectional view of the measuring device, showing arrangement of valves, &c. Fig. 3 is a plan view of the measuring-can. Fig. 4 is a plan view of the adjustable can-support or bracket.

A is the tank or reservoir, made in the usual manner, and provided with a cylindrical measuring-can, B, in the center of which a tube, C, is secured, extending upward nearly to the top, as shown. One side of the tube C is made flat, as shown in Fig. 3, and is provided with openings 1, 2, 3, and 4 at certain distances from the bottom of the measure upward, and at points corresponding to the height required for the measurement of half-pints, pints, quarts, &c., as indicated by the dotted lines in Figs. 1 and 2. These openings or ports will be covered by valves $a$ $a'$ $a''$ $a'''$, which are to be operated in any suitable manner from the outside of the measure. Below the measure the tube C is continued in a circular shape, $C'$, and forms a pump-cylinder, by means of which the desired quantity of liquid may be elevated into the measure. F is a faucet or cock secured in the measure, through which the oil or liquid may be drawn off. In this cock F a check-valve, $d$, is placed to prevent anything being returned or forced back into the tank. G is a shelf or bracket, upon which the can H, or other vessel into which it is desired to draw the oil or liquid, is placed. This shelf or bracket is made to work in upright friction ways or slides $e$ $e$, by means of which it may be adjusted to the height desired, in order to bring the nozzle of the can and cock in close proximity to each other, and thus obviate the necessity or use of a funnel. A padlock, or other equivalent device, D, will be placed upon lid I, through which the oil is introduced into the tank.

The following is a description of the mode of operation: The can or vessel into which the oil or liquid is to be filled having been placed upon the bracket or shelf G, and the quantity to be measured to be one quart, the valve $a''$ or the quart-opening 3 is raised; the pump is then operated until a sufficient quantity of liquid enters the measure $a''$, and all liquid over a quart flows back into the tank through the opening or port 3. The measurement of larger or smaller quantities is performed by the opening of the valve corresponding thereto. A glass front will be placed in the measure B, or the cylinder B may be made entirely of glass. J is a tape indicator, having a float, $g$, and counter-weight, $h$, working over a wheel, $m$, by which, through a glass window or its equivalent, the amount of liquid in the tank may be ascertained at all times.

One of the objects of my invention is to prevent the adulteration of the oil or liquid by the retail dealer.

By my invention nothing can be introduced into the tank as long as the seal or lock placed upon the lid of the same by the wholesale dealer or manufacturer remains intact.

I do not wish to confine myself to the exact form of valves shown, as I am aware that many devices may be employed for the purpose, nor do I wish to confine myself to the form of check-valve shown in the cock F. Any other valve may be employed for the purpose.

I claim—

1. The measuring device consisting of the cylindrical vessel or can B, tube C, having openings 1 2 3 4 and valves $a$ $a'$ $a''$ $a'''$, or their equivalents, pump E, and cock F, having check-valve $d$, arranged and operated substantially as hereinbefore set forth.

2. The combination and arrangement of the adjustable shelf or bracket G, ways or guides $e$ $e$, tank A, and measure B, as hereinbefore specified.

JOSEPH LESSLER.

Witnesses:
C. N. WOODWARD,
M. PINNER.